(12) United States Patent
Otsuki et al.

(10) Patent No.: US 7,433,754 B2
(45) Date of Patent: Oct. 7, 2008

(54) NUMERICAL CONTROLLER

(75) Inventors: Toshiaki Otsuki, Hino (JP); Soichiro Ide, Fujiyoshida (JP)

(73) Assignee: Fanuc Ltd, Yamanashi (JP)

( * ) Notice: Subject to any disclaimer, the term of this patent is extended or adjusted under 35 U.S.C. 154(b) by 0 days.

(21) Appl. No.: 11/790,069

(22) Filed: Apr. 23, 2007

(65) Prior Publication Data
US 2007/0250206 A1 Oct. 25, 2007

(30) Foreign Application Priority Data
Apr. 24, 2006 (JP) .............................. 2006-119446

(51) Int. Cl.
*G06F 19/00* (2006.01)

(52) U.S. Cl. ...................... 700/159; 700/170

(58) Field of Classification Search ......... 700/186–194, 700/159, 117, 177–179, 174, 170; 708/290, 708/442; 318/560, 567, 568.18; 409/183
See application file for complete search history.

(56) References Cited

U.S. PATENT DOCUMENTS

| 5,305,228 | A |   | 4/1994 | Seki et al. |
| 5,936,864 | A | * | 8/1999 | Otsuki et al. ............... 700/188 |
| 6,401,006 | B1 | * | 6/2002 | Mizuno et al. ............. 700/189 |
| 6,735,495 | B2 |   | 5/2004 | Munz |
| 6,999,845 | B2 | * | 2/2006 | Hirai et al. ................. 700/189 |
| 2001/0005800 | A1 | * | 6/2001 | Shiba et al. ................. 700/193 |

FOREIGN PATENT DOCUMENTS

| EP | 0890890 | 1/1999 |
| JP | 4-088511 | 3/1992 |
| JP | 9-073309 | 3/1997 |
| JP | 11-231925 | 8/1999 |
| JP | 2003-308115 | 10/2003 |

OTHER PUBLICATIONS

Notice of Reasons for Rejection dated Jan. 24, 2008, and issued in corresponding Japanese Patent Application.
European Search Report dated May 14, 2008, issued in corresponding European Patent Application.

* cited by examiner

*Primary Examiner*—Kidest Bahta
(74) *Attorney, Agent, or Firm*—Staas & Halsey LLP

(57) ABSTRACT

A numerical controller configured to enable machining of a conical surface such that vectors at a start point, an end point, and an interpolation point of a circular arc and their extensions never cross one another. Normal direction vectors Vnors and Vnore, tangential direction vectors Vtans and Vtane, and tool posture vectors Vts and Vte at the starting and end points are obtained based on programmed positions PA' and PB' of the starting and end points, a circle center position, and rotational positions of two rotary axes. Based on these vectors, tangential direction angles as and ae and the normal direction angles bs and be with respect to tool postures at the starting and end points are obtained. Normal and tangential direction vectors Vnori and Vtani and angles ai and bi at the interpolation point are obtained by interpolating the normal and tangential direction vectors and angles at the starting and end points, whereby a tool posture vector Vti at the interpolation point is obtained. The rotational positions of the rotary axes and positions of linear axes are obtained based on the tool posture vector Vti at the interpolation point. Circular machining can be also performed for a three-dimensional programmed circular arc.

8 Claims, 10 Drawing Sheets

NUMERICAL CONTROLLER

BACKGROUND OF THE INVENTION

1. Field of the Invention

The present invention relates to a numerical controller for a machining apparatus having three linear axes and at least two rotary axes for performing five-axis machining.

2. Description of Related Art

Described in U.S. Pat. No. 6,735,495 is a known arrangement for five-axis machining in which a conical surface or the like is machined by programming a movement path for a tool end point and specifying tool postures at a start point and an end point of the movement path.

FIGS. 11a and 11b are views illustrating the conical surface machining described in U.S. Pat. No. 6,735,495. FIG. 11a is a stereographic view, and FIG. 11b is a plan view taken from above FIG. 11a. In this machining, a path for a tool tip is designated by a circular arc, and tool posture vectors at a start point and an end point of the path are programmed as a start point vector and an end point vector, respectively. A first angle PHI on a plane that connects the starting and end point vectors (angle between the start point vector and a line as a projection of the tool posture vector on the vector connecting plane) and a second angle PSI of a tool posture vector perpendicular to the connecting plane are interpolated. By doing this, the conical surface can be machined in a manner such that the tool tip is moved along the programmed circular arc and that the tool posture on the conical surface is changed from the direction of the start point vector to that of the end point vector.

As shown in FIG. 12, moreover, a method is also described in which a conical surface is machined by interpolating a conical rotational angle around the central axis of the tool posture vector, which is given as the first angle PHI, and a conical tip angle as the second angle PSI. As shown in FIG. 13, furthermore, there is described a case where machining is performed for a noncircular bottom face along which the tool end point moves with those angles varied with respect to the conical surface by polynomial interpolation.

The arrangement described in U.S. Pat. No. 6,735,495 is based on the assumption that machining is performed on the conical surface or a surface varied with respect to it and that the start point vector, end point vector, and tool posture vector on the conical surface being interpolated, or their extensions cross one another at one point.

However, the given starting and end point vectors and the tool posture vector obtained by calculation are not always present on the same conical surface. In machining a surface having the shape shown in FIGS. 14a and 14b, for example, the method described in the aforementioned patent document cannot ensure interpolation.

FIG. 14a is a stereographic view, and FIG. 14b is a plan view taken from above FIG. 14a. In the example shown in FIGS. 14a and 14b, extensions of starting and end point vectors never cross each other. This is because the starting and end point vectors are not on a conical surface with a circular bottom face.

SUMMARY OF THE INVENTION

The present invention provides a numerical controller configured to enable machining of even the machined surface shown in FIG. 14, that is, to enable five-axis machining of any of conical surfaces in which a start point vector, end point vector, and tool posture vector on a conical surface being interpolated, or their extensions never cross one another.

A numerical controller of the present invention controls a machining apparatus having a tool for machining a workpiece and servomotors for driving a plurality of axes including at least two rotary axes, wherein interpolation processing is performed on a motion path of the tool commanded by a machining program and motion commands are outputted respectively for the plurality of axes based on the interpolation processing. The numerical controller comprises: analyzing means for analyzing commands of the machining program and obtaining data of a shape of a circular arc, positions of a start point and an end point of the circular arc, and postures of the tool relative to the workpiece at the start point and the end point of the circular arc, respectively; interpolating means for obtaining data of an interpolated position of the circular arc and a posture of the tool at the interpolated position of the circular arc at every sampling period based on the data obtained by said analyzing means; position calculating means for obtaining target positions of the plurality of axes based on the data obtained by said interpolating means; and moving means for moving the plurality of axes to the target positions obtained by said position calculating means.

The analyzing means may obtain data of an length of the circular arc, angles between the posture of the tool and a tangential direction of the circular arc at the start point and the end point of the circular arc, respectively, and angles between the posture of the tool and a normal direction of the circular arc on a plane on which the circular arc is placed at the start point and the end point of the circular arc, respectively, and the interpolating means may obtain an arc length from the start point to the interpolated position of the circular arc, and an angle between the posture of the tool and the tangential direction of the circular arc and an angle between the posture of the tool and the normal direction of the circular arc at the interpolated position of the circular arc by interpolating the angles of the posture of the tool at the start point and the end point of the circular arc obtained by said analysis means using the length of the circular arc and the arc length from the start point to the interpolated position of the circular arc.

The position calculating means may obtain a tool posture vector indicative of the posture of the tool at the interpolated position of the circular arc based on the data obtained by said interpolating means, and obtain the rotational positions of the rotary axes and positions of the axes other than the rotational axes at the interpolated point of the circular arc using the tool posture vector.

The commands of the machining program may include designation of positions of a center, the start point and the end point of the circular arc, and designation of rotational positions of the rotary axes at the start point and the end point of the circular arc.

The commands of the machining program may include designation of the positions of the start point and the end point of the circular arc and a position of an midpoint of the circular arc, and designation of rotational positions of the rotary axes at the start point, the end point and the midpoint of the circular arc.

The machining apparatus may have a tool head arranged rotatable by the two rotary axes, a table arranged rotatable by the two rotary axes, or a tool head and also a table arranged rotatable by the two rotary axes.

Machining can be performed for any of conical surfaces, in which the tool posture vector at the start point, tool posture vector at the end point, and tool posture vector on a conical surface being interpolated, or their extensions never cross one another, and other machined surfaces in which the vectors cross one another. The programmed circular arc is not limited to a two-dimensional one, and machining can be also performed for a three-dimensional programmed circular arc.

DETAILED DESCRIPTION

Figure 1:
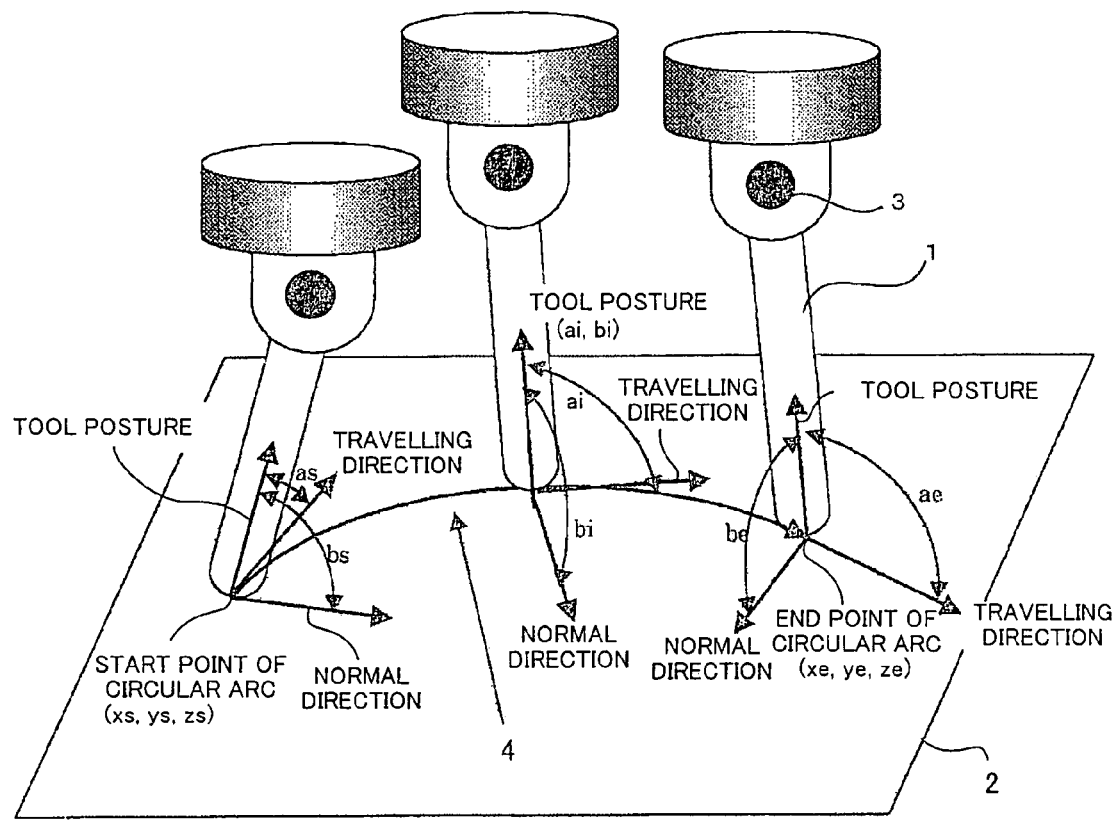
FIG. 1 is a view illustrating the principle of the present invention.

FIG. 1 is a view illustrating the principle of the present invention.

In FIG. 1, numeral 1 denotes a tool, 2 denotes a circular-arc plane on which a programmed circular shape 4 is located, and 3 denotes an XYZ-axis control point for linear axes. Let it be supposed that a circular shape from a start point (xs, ys, zs) to an end point (xe, ye, ze) is programmed. A traveling direction stated herein is the traveling direction of a circular arc, and a normal direction is a direction perpendicular to the circular traveling direction on the circular-arc plane, and angles and lengths are defined as follows:

as: angle to the traveling direction at the start point,
bs: angle to the normal direction at the start point,
ae: angle to the traveling direction at the end point,
be: angle to the normal direction at the end point,
ai: angle to the traveling direction at an interpolation pint,
bi: angle to the normal direction at the interpolation point,
cl: programmed arc length, and
ci: arc length from the start point to the circular interpolation point.

Further, vectors are defined as follows:

Vt (i, j, k): tool posture vector indicative of a tool posture,
Vts (is, js, ks): tool posture vector at the start point,
Vte (ie, je, ke): tool posture vector at the end point,
Vtans (tanis, tanjs, tanks): traveling direction vector indicative of the traveling direction at the start point,
Vnors (noris, norjs, norks): normal direction vector indicative of the normal direction at the start point,
Vtane (tanie, tanje, tanke): traveling direction vector indicative of the traveling direction at the end point,
Vnore (norie, norje, norke): normal direction vector indicative of the normal direction at the end point,
Vtani (tanii, tanji, tanki): traveling direction vector indicative of the traveling direction at the interpolation point,
Vnori (norii, norji, norki): normal direction vector indicative of the normal direction at the interpolation point, and
Vti (ii, ji, ki): tool posture vector at the interpolation point.

The programmed arc length cl is obtained from the programmed start point (xs, ys, zs) and end point (xe, ye, ze) and a circular command. Further, the normal direction vectors Vnors and Vnore and the traveling direction vectors Vtans and Vtane at the starting and end points are obtained from the starting and end points and an arc center. Furthermore, the tool posture vectors Vts and Vte at the starting and end points are obtained from commands that are indicative of tool postures at the starting and end points. Based on these vectors, moreover, the angles as and ae between the tool posture and the traveling direction and the angles bs and be between the tool posture and the normal direction at the starting and end points are obtained. Conventionally, an interpolation position (cxi, cyi, czi) on the circular arc is obtained by circular interpolation processing, a well-known technique, and the circular arc ci from the start point to the interpolation position is obtained. Further, tool postures (ai, bi) at the interpolation point are obtained as follows:

$$ai = ci/cl*(ae-as)+as, \quad (1)$$

$$bi = ci/cl*(be-bs)+bs. \quad (2)$$

Furthermore, the traveling direction vector Vtani and the normal direction vector Vnori at the interpolation point are obtained by the conventional circular interpolation processing.

Figure 2:
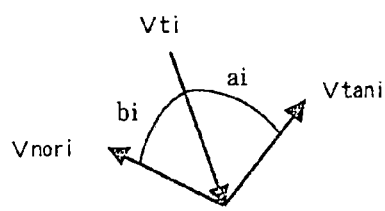
FIG. 2 is a diagram illustrating relations between a tool posture, traveling direction vector, normal direction vector, and tool posture vector at an interpolation point.

FIG. 2 shows relations between the tool postures (ai, bi), traveling direction vector Vtani (tanii, tanji, tanki), normal direction vector Vnori (norii, norji, norki), and tool posture vector Vti (ii, ji, ki) at the obtained interpolation point. Based on the inner product of the tool posture vector Vti and the traveling direction vector Vtani and the inner product of the tool posture vector Vti and the normal direction vector Vnori, the following equations (3) and (4) hold:

$$Vti \cdot Vtani = \cos(ai) \quad (3)$$
$$(-(ii, ji, ki) \cdot (tanii, tanji, tanki)) = \cos(ai) -$$
$$(ii*tanii + ji*tanji + ki*tanki) = \cos(ai),$$

$$Vti \cdot Vnori = \cos(bi) \quad (4)$$
$$(-(ii, ji, ki) \cdot (norii, norji, norki)) = \cos(bi) -$$
$$(ii*norii + ji*norji + ki*norki) = \cos(bi).$$

Since the tool posture vector Vti is a unit vector, moreover, the following equation (5) holds:

$$ii2+ji2+ki2=1 \quad (5)$$

The tool posture vector Vti (ii, ji, ki) is obtained from these equations (3) to (5).

The rotational position of a rotary axis is determined from the obtained tool posture vector Vti (ii, ji, ki). Further, the positions of the linear axes, that is, positions (Xai, Yai, Zai) for the XYZ-axis control point 3, can be obtained from the interpolation position (cxi, cyi, czi) obtained by circular interpolation and the tool posture vector Vti (ii, ji, ki) or the rotational position of the rotary axis. The rotational position of the rotary axis and the XYZ-axis control point positions (Xai, Yai, Zai) are obtained in different ways depending on the configuration of the rotary axis of a machine tool, which will be described later.

X-, Y-, and Z-axes as the linear axes are moved to the XYZ-axis control point positions (Xai, Yai, Zai) thus obtained as interpolation positions, and the rotary axis is moved to the interpolated rotational position. By doing this, the axes can be driven so that a tool end point is located in an arc position and the tool postures are at the interpolated angles (ai, bi).

According to this system, a start point vector and an end point vector can be interpolated without regard to intersection of their respective extensions, so that a conical surface can be machined.

The aforementioned tool posture is a direction of the tool relative to a workpiece. Therefore, this system can be applied equally to a machine with a rotatable tool head, a machine with a rotatable table, and a machine of which both a tool head and a table are rotatable.

First Embodiment

Figure 3:
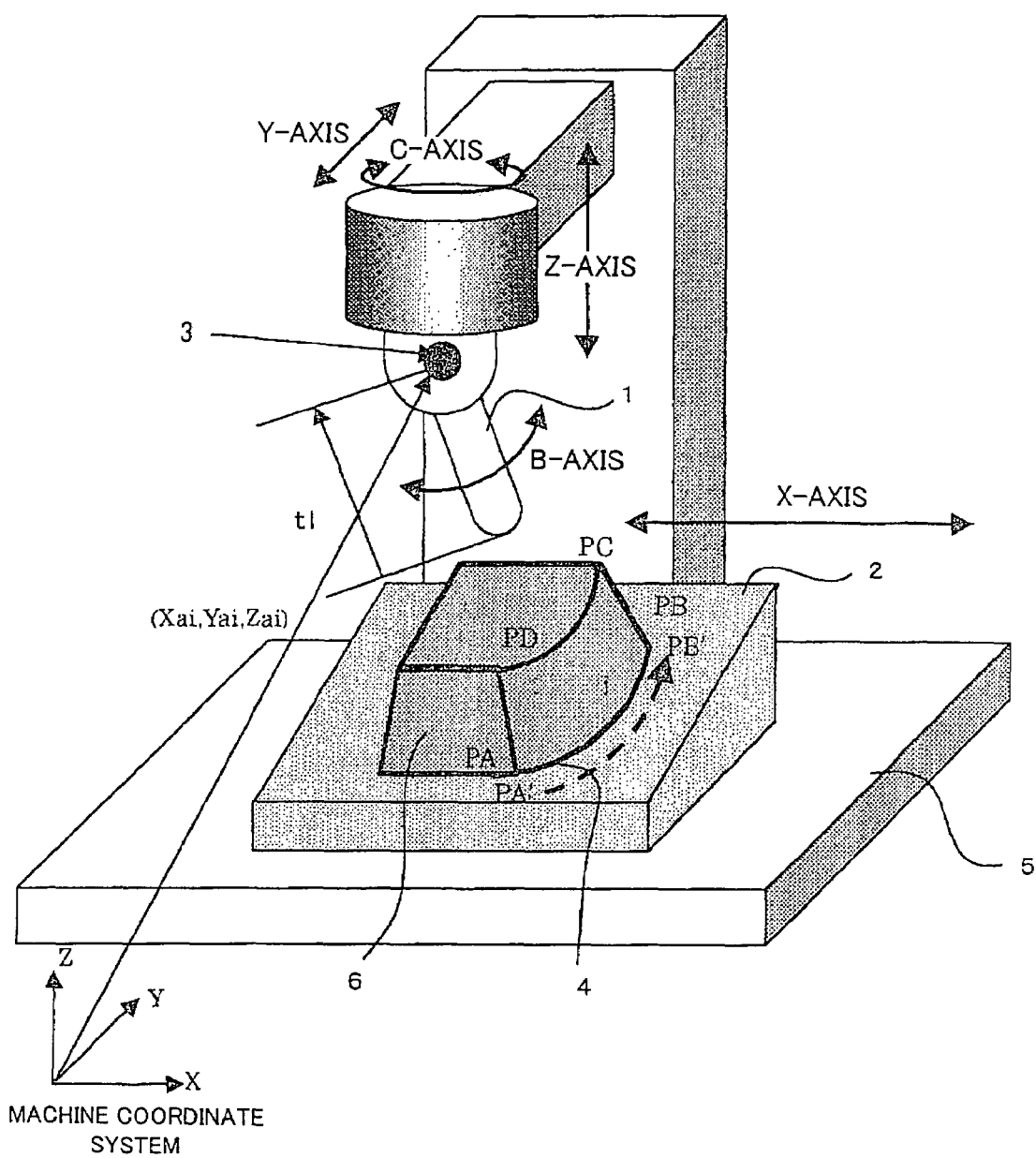
FIG. 3 is a view showing a configuration of a five-axis machine for carrying out machining according to first and second embodiments of the invention.

According to a first embodiment, the present invention is applied to a numerical controller for controlling a five-axis machine. As shown in FIG. 3, the five-axis machine has X-, Y-, and Z-axes, which are linear axes, a B-axis for the rotation of a head of a tool 1 around the Y-axis, and a C-axis for the rotation around Z-axis. In this machine, the tool 1 linearly moves and rotates relatively to a workpiece 6 that is mounted on a table 5.

FIG. 3 shows a case where the workpiece 6 is machined to form a conical surface that is surrounded by points PA, PB, PC and PD. A line PA-PB is a circular arc. The circular-arc plane 2 need not be based on a two-dimensional circle on an X-Y, Y-Z or Z-X plane. In the example shown in FIG. 3, the circular arc PA-PB is designated on a surface that is inclined to the X-Y plane. However, a circular arc PA'-PB' based on consideration of the tool diameter is programmed as an actual circular command for the PA-PB.

In this case of the first embodiment, the circular-arc plane 2 is designated by the X-Y plane. A program used in this case, for example, is as follows:

G43.4 H01: Tool end point control command,
G90 G01 X100.0 Y200.0 Z50.0 B-10.0 F1000: Commands for movement to point PA' and tool tilting,
G03 G17 X160.555 Y400.0 I-300.0 J200.0 B-20.0 C20.0: Circular command for point PB' and command for tool tilting,
...
...
G49: Canceling of tool end point control. In this program, "G43.4" is a code indicative of a tool end point control command, "H" is a code that specifies an offset number, and "H01" is a command that specifies an offset number 01. Further, "G90" is a code for an absolute command, "G01" is a code for a linear interpolation (cutting feed) command, and X, Y, Z, B and C are position commands for the X-, Y-, Z-, B-, and C-axes, respectively. F is a velocity command. Further, "G03" is a circular interpolation command (counterclockwise), I is a command for an X-axis component from the arc start point to the arc center, and J is a command for a Y-axis component from the arc start point to the arc center.

Since normal lines never fail to be directed to the arc center, the normal direction vector Vnors (noris, norjs, norks) at the start point, programmed in this manner, can be obtained as Vnors=$(-3/\sqrt{(13)}, 2/\sqrt{(13)}, 0)$=(-0.832, 0.555, 0.0), based on I=X-axis component from the arc start point to the arc center=300.0 and J=Y-axis component from the arc start point to the arc center=200.0. Further, the traveling direction vector Vtans (tanis, tanjs, tanks) at the start point, which is perpendicular to the normal direction vector Vnors, can be obtained as Vtans (0.555, 0.832, 0.0).

Since the programmed positions for the B- and C-axes at the start point are B=-10.0 and C=10.0, respectively, moreover, the tool posture vector Vts (is, js, ks) at the start point can be obtained as Vts (-sin B cos C, -sin B sin C, -cos B)=(-sin(-10.0)cos(10.0)), -sin(-10.0)sin(-10.0)-cos(10.0))= (0.171, 0.030, -0.985).

Likewise, the normal direction vector Vnore, traveling direction vector Vtane, and tool posture vector Vte at the end point can be obtained as Vnore=(-1.0, 0.0, 0.0), Vtane=(0.0, 1.0, 0.0), and Vte=(-sin(-20.0)cos(20.0)), -sin(-20.0)sin (20.0)-cos(-20.0))=(0.321, 0.117, -0.940), respectively.

The angle as to the traveling direction at the start point can be obtained as as=94.001 degrees by calculating the inner product of the tool posture vector Vts and the traveling direction vector Vtans at the start point. The angle bs to the normal direction at the start point can be obtained as bs=84.85 degrees by calculating the inner product of the tool posture vector Vts and the normal direction vector Vnors at the start point. The angle ae to the traveling direction at the end point can be obtained as ae=83.282 degrees by calculating the inner product of the tool posture vector Vte and the traveling direction vector Vtane at the end point. The angle be to the normal direction at the end point can be obtained as be=71.253 degrees by calculating the inner product of the tool posture vector Vte and the normal direction vector Vnore at the end point.

Figure 4:
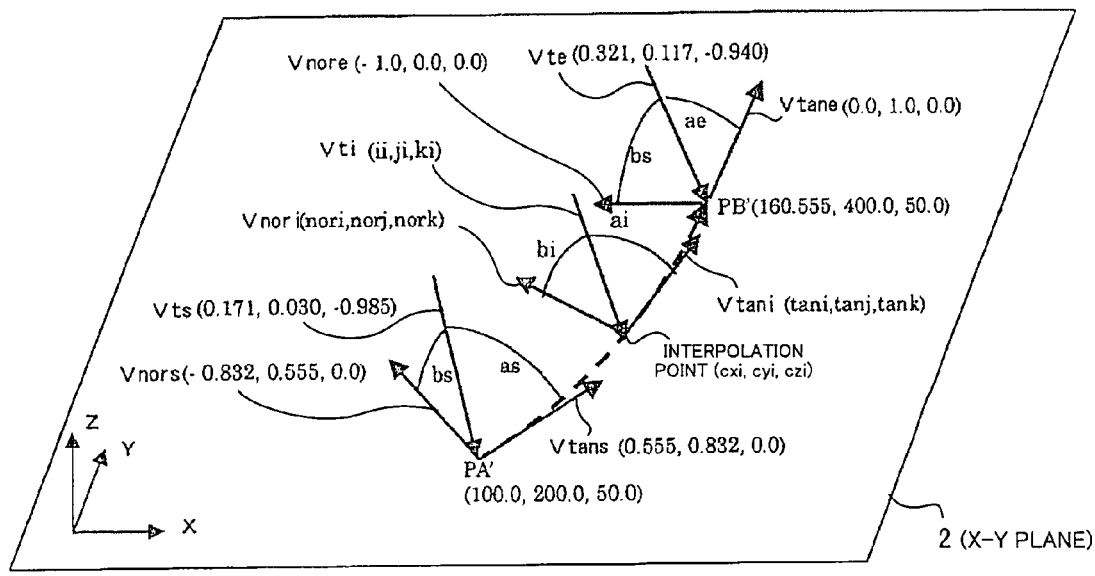
FIG. 4 is a diagram illustrating traveling direction vectors, normal direction vectors, and tool posture vectors at a start point, end point, and midpoint according to the first embodiment of the invention.

FIG. 4 shows traveling, normal, and tool posture vectors at the start point PA' and the end point PB' in the program. Each vector is a unit vector.

Further, the radius of the circular arc is obtained from the programmed values I and J, the rotational angle of the circular arc is obtained from a variation from the normal direction vector Vnors at the start point to the normal direction vector Vnore at the end point, and the programmed arc length cl is obtained based on the radius and the rotational angle. In the case of this program, the arc length cl is cl=212.007.

Thereupon, the conventional circular interpolation, a prior art technique, is performed as the circular interpolation point (cxi, cyi, czi) is obtained and the tool postures (ai, bi) are calculated according to the aforesaid equations (1) and (2). Further, the traveling direction vector Vtani and the normal direction vector Vnori at the interpolation point are obtained by the conventional circular interpolation.

The tool posture vector Vti (ii, ji, ki) is obtained by executing the calculations of the aforesaid equations (3) and (5) based on the tool postures (ai, bi), traveling direction vector Vtani, and normal direction vector Vnori at the interpolation point obtained in this manner.

The following equation (6) holds, since the tool posture vector Vti (ii, ji, ki) is obtained by rotating a tool posture (0, 0, -1) with the B- and C-axis positions at 0 degree by B- and C-axis positions Bai and Cai, respectively. The B- and C-axis positions Bai and Cai for distances of movement can be obtained by solving the equation (6). Although a plurality of solutions can be obtained for Bai and Cai, positions that are close the latest B- and C-axis positions are selected.

$$\begin{pmatrix} ii \\ ji \\ ki \end{pmatrix} = \begin{pmatrix} \cos(Cai) & -\sin(Cai) & 0 \\ \sin(Cai) & \cos(Cai) & 0 \\ 0 & 0 & 1 \end{pmatrix} \begin{pmatrix} \cos(Bai) & 0 & \sin(Bai) \\ 0 & 1 & 0 \\ -\sin(Bai) & 0 & \cos(Bai) \end{pmatrix} \begin{pmatrix} 0 \\ 0 \\ -1 \end{pmatrix} \quad (6)$$

If the tool length specified by the program code "H01" is tl, the X-axis position Xai, Y-axis position Yai, and Z-axis position Zai for the movement or the position of the XYZ-axis control point 3 (at which the B- and C-axes, rotary axes, cross each other) can be obtained by compensating the circular interpolation point (cxi, cyi, czi) with the tool length tl according to the following equations (7) to (9):

$$Xai = cxi - ii * tl, \quad (7)$$

$$Yai = cyi - ji * tl, \quad (8)$$

$$Zai = czi - ki * tl. \quad (9)$$

Thus, the workpiece 6 can be machined to form the conical surface surrounded by the points PA, PB, PC and PD, as shown in FIG. 3, by moving the X-, Y-, and Z-axes to the positions Xai, Yai and Zai, respectively, and moving the rotary axes or the B- and C-axes to the positions Bai and Cai, respectively, obtained according to the equation (6).

Second Embodiment

The configuration of a machine tool controlled by a numerical controller according to this second embodiment is identical to that of the first embodiment shown in FIG. 3. Also in the second embodiment, a conical surface surrounded by points PA, PB, PC and PD is formed by machining, and a line PA-PB is a circular arc. However, this circular arc is not a two-dimensional arc on the X-Y, Y-Z or Z-X plane. A circular-arc plane 2 on which the circular arc is designated is inclined and is not a two-dimensional arc, so that a midpoint PM is programmed.

As in the case of the first embodiment, a circular arc PA'-PB' and a midpoint PM' based on consideration of the tool diameter are programmed as actual circular commands.

If a circular arc is programmed with the start point PA' of (100.0, 200.0, 50.0), end point PB' of (174.166, 400.0, 150.0), and arc center of (−200, 400, 150), (157.071, 300.0, 100.0) can be programmed for the midpoint PM', for example. In this case, a program may be given as follows:

G43.4 H01: Tool end point control command,

G90 G01 X100.0 Y200.0 Z50.0 B-10.0 F1000: Commands for movement to point PA' and tool tilting, G03.4 X157.071 Y300.0 Z100.0 B-15.0 C15.0: Commands for three-dimensional circular arc, PM' (midpoint), tool tilting at midpoint, X174.166 Y400.0 Z150.0 B-20.0 C20.0: Commands for movement to point PB' and tool tilting,

. . .

. . .

G49: Canceling of tool end point control.

Figure 5:
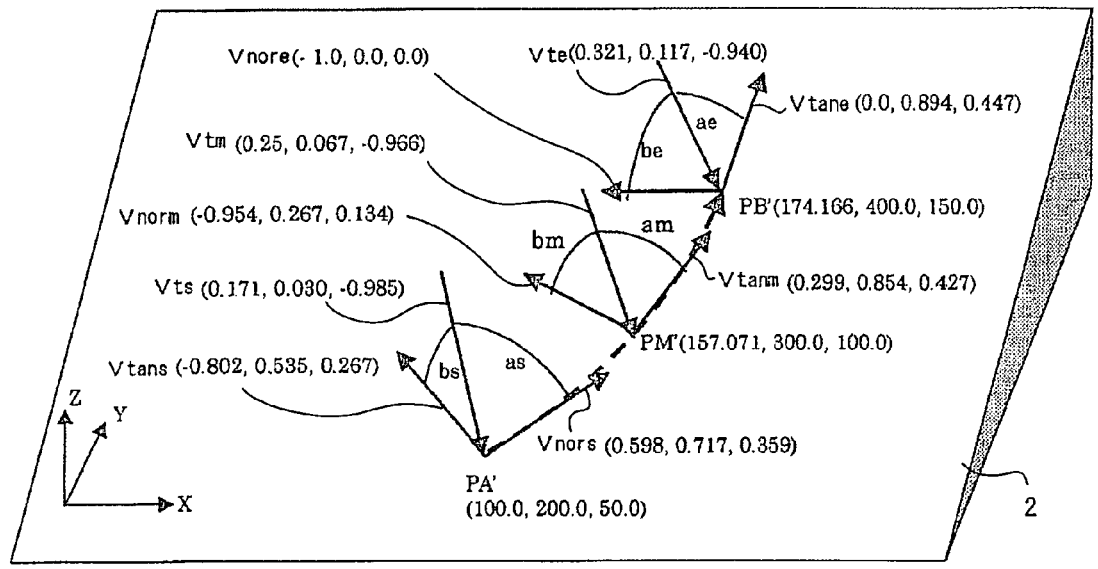
FIG. 5 is a diagram illustrating traveling direction vectors, normal direction vectors, and tool posture vectors at a start point, end point, and midpoint according to the second embodiment of the invention.

Based on these program commands and the arc center, the traveling direction vectors Vtans, Vtane and Vtanm, normal direction vectors Vnors, Vnore and Vnorm, and tool posture vectors Vts, Vte and Vtm at the start point PA', end point PB', and midpoint PM' are obtained in the same manner as in the first embodiment. FIG. 5 shows these vectors. Each vector is a unit vector.

Based on the traveling, normal, and tool posture vectors at the individual points obtained in this manner, as in the first embodiment, the angles as and ae to the traveling direction at the starting and end points and an angle am between the traveling and tool postures at the midpoint can be obtained as as=76.744 degrees, ae=71.602 degrees, and am=73.718 degrees, respectively, by calculating the inner product of the tool and traveling direction vectors, and the angles bs and be to the normal direction at the starting and end points and an angle bm between the normal and tool postures at the midpoint can be obtained as bs=67.406 degrees, be=71.253 degrees, and bm=69.528 degree, respectively, by calculating the inner product of the tool and normal direction vectors.

As in the first embodiment, moreover, a programmed arc length clm from the start point PA' to the midpoint PM' is obtained as clm=126.124, and a programmed arc length clb from the midpoint PM' to the end point PB' as clb=113.538.

Then, circular interpolation in a three-dimensional space, a conventional technique, is performed as the arc length ci from the start point to the circular interpolation position is obtained, and the tool postures (ai, bi) at the interpolation point are obtained as follows:

(1) Case of the interpolation point from the start point PA' to the midpoint PM':

$$ai = ci/clm * (am - as) + as, \quad (10)$$

$$bi = ci/clm * (bm - bs) + bs, \quad (11)$$

(2) Case of the interpolation point from the midpoint PM' to the end point PB':

$$ai = (ci - clm)/clb * (ae - am) + am, \quad (12)$$

$$bi = (ci - clm)/clb * (be - bm) + bm. \quad (13)$$

The second embodiment differs from the first embodiment in the method of obtaining the tool postures (ai, bi) at the interpolation point. More specifically, the difference lies in that the equations (1) and (2) for the calculations of the tool postures (ai, bi) according to the first embodiment are replaced with the equations (10) to (13).

As in the first embodiment, furthermore, the traveling direction vector Vtani and the normal direction vector Vnori at the interpolation point can be obtained by the conventional circular interpolation in a three-dimensional space.

The tool posture vector Vti (ii, ji, ki) is obtained by executing the calculations of the aforesaid equations (3) and (5) based on the tool postures (ai, bi), traveling direction vector Vtani, and normal direction vector Vnori at the interpolation point obtained in this manner, as in the first embodiment, and the B- and C-axes to Bai and Cai are obtained by further executing the calculation of the equation (6).

As in the first embodiment, moreover, the X-axis position Xai, Y-axis position Yai, and Z-axis position Zai for the movement are obtained by executing the calculations of the equations (7) to (9).

A workpiece 6 can be machined to form the conical surface surrounded by the points PA, PB, PC and PD, as shown in FIG. 3, by moving the X-, Y-, and Z-axes to the obtained positions Xai, Yai and Zai, respectively, and moving the rotary axes or the B- and C-axes to the obtained positions Bai and Cai, respectively,

Third Embodiment

Figure 6:
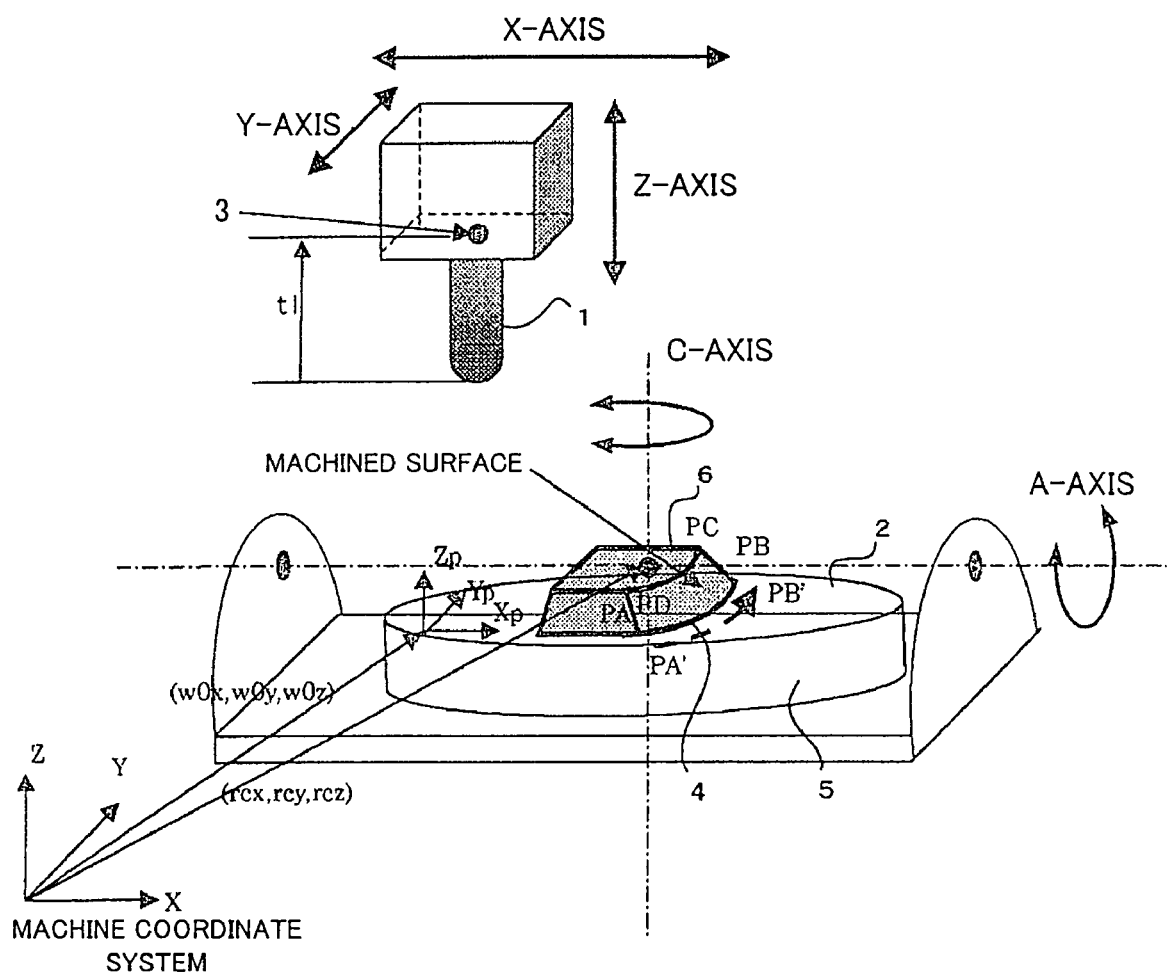
FIG. 6 is a view showing a configuration of a five-axis machine for carrying out machining according to a third embodiment of the invention.

This third embodiment is an example in which a conical surface is formed by machining with use of a machine tool for five-axis machining designed so that a table on which a workpiece is mounted, not a tool head, is rotated. FIG. 6 shows an outline of this machine tool. It has X-, Y-, and Z-axes, which are linear axes perpendicular to one another, a rotary A-axis for rotation parallel to the X-axis, and a rotary C-axis for rotation parallel to the Z-axis. A tool 1 linearly moves relatively to a table 5 and a workpiece 6, and the table 5 is rotated by the rotary A- and C-axes.

In machining the workpiece 6 on the table 5 to form a surface that is surrounded by points PA, PB, PC and PD, also in the machine constructed in this manner, PA'-PB' is programmed as a circular arc in consideration of the tool diameter, as in the first and second embodiments. This machining can be carried out in the same manner as in the first and second embodiments.

In this case, Xp-Yp-Zp on the table 5 of FIG. 6 is used as a program coordinate system, which serves for programming thereon. The program coordinate system serves as a workpiece coordinate system when a tool end point control mode is programmed. The origin of the workpiece coordinate system is given by (w0x, w0y, w0z). The respective centers of rotation of the A- and C-axes are supposed to cross each other, and their positions are given by (rcx, rcy, rcz). The program coordinate system rotates as the table rotates.

In the third embodiment, as in the first and second embodiments, an interpolation position (cxi, cyi, czi) on the circular arc is obtained, the tool postures (ai, bi) at each interpolation point are obtained, and moreover, the tool posture vector Vti (ii, ji, ki) is obtained. Thus, if a circular arc PA-PB is programmed as a two-dimensional circular arc on the X-Y, Y-Z or Z-X plane in the program coordinate system, the tool postures (ai, bi) are obtained according to the equations (1) and (2), and the tool posture vector Vti (ii, ji, ki) is obtained according to the equations (3), (4) and (5). If the circular arc PA-PB is not a two-dimensional circular arc, on the other hand, the midpoint PM is programmed, the tool postures (ai, bi) are obtained according to the equations (10) to (13), and the tool posture vector Vti (ii, ji, ki) is then obtained according to the equations (3), (4) and (5).

Subsequently, an A-axis position Aai, C-axis position Cai, X-axis position Xai, Y-axis position Yai, and Z-axis position Zai for movement are obtained according to the following equations (14) and (15) in place of the equations (6) to (9).

Since the tool posture on a machine coordinate system is (0, 0, −1), the tool posture vector Vti (ii, ji, ki) should be rotated by the C- and A-axis positions Cai and Aai to obtain (0, 0, −1), so that the equation (14) holds. The C- and A-axis positions Cai and Aai for movement can be obtained by solving the equation (14). Since the positive direction of the table rotation is reverse to that of the coordinate system, Aai and Cai have a negative sign.

$$\begin{pmatrix} 0 \\ 0 \\ -1 \end{pmatrix} = \begin{pmatrix} 1 & 0 & 0 \\ 0 & \cos(-Aai) & -\sin(-Aai) \\ 0 & \sin(-Aai) & \cos(-Aai) \end{pmatrix} \begin{pmatrix} \cos(-Cai) & -\sin(-Cai) & 0 \\ \sin(-Cai) & \cos(-Cai) & 0 \\ 0 & 0 & 1 \end{pmatrix} \begin{pmatrix} ii \\ ji \\ ki \end{pmatrix} \quad (14)$$

If the circular interpolation point on the program coordinate system is (cxi, cyi, czi), moreover, the X-, Y-, and Z-axis positions Xai, Yai and Zai for movement can be obtained by executing the calculation of the following equation (15). The positions Xai, Yai and Zai correspond to the XYZ-axis control point (root position of the tool) 3 shown in FIG. 6.

$$\begin{pmatrix} Xai \\ Yai \\ Zai \\ 1 \end{pmatrix} = \begin{pmatrix} 1 & 0 & 0 & rcx \\ 0 & \cos(-Aai) & -\sin(-Aai) & rcy \\ 0 & \sin(-Aai) & \cos(-Aai) & rcz \\ 0 & 0 & 0 & 1 \end{pmatrix} \begin{pmatrix} \cos(-Cai) & -\sin(-Cai) & 0 & 0 \\ \sin(-Cai) & \cos(-Cai) & 0 & 0 \\ 0 & 0 & 1 & 0 \\ 0 & 0 & 0 & 1 \end{pmatrix} \begin{pmatrix} w0x + cxi - rcx \\ w0y + cyi - rcy \\ w0z + czi - rcz \\ 1 \end{pmatrix} + \begin{pmatrix} 0 \\ 0 \\ t1 \\ 0 \end{pmatrix} \quad (15)$$

Fourth Embodiment

Figure 7:
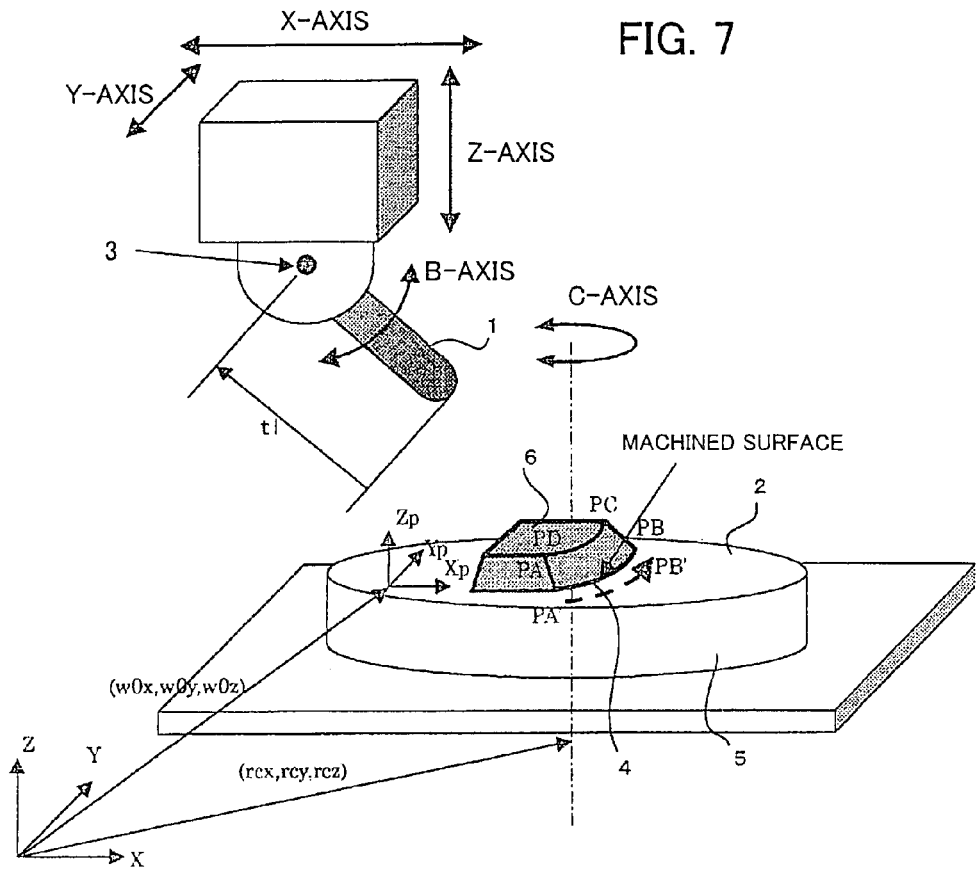
FIG. 7 is a view showing a configuration of a five-axis machine for carrying out machining according to a fourth embodiment of the invention.

In this fourth embodiment, as shown in FIG. 7, the rotary axis of a table 5 is a single axis (C-axis), and machining is performed by means of a five-axis machine of which a tool has one rotary axis (B-axis). This machine has X-, Y-, and Z-axes, which are linear axes perpendicular to one another, the rotary B-axis for tool rotation parallel to the Y-axis, and a rotary C-axis for rotation of a table 5 parallel to the Z-axis.

Also in the machine constructed in this manner, a workpiece 6 mounted on the table 5 can be machined to form a conical surface that is surrounded by points PA, PB, PC and PD. As in the first and second embodiments, PA'-PB' is programmed as a circular arc in consideration of the tool diameter. This machining can be carried out in the same manner as in the first and second embodiments.

In this case, Xp-Yp-Zp on the table 5 of FIG. 7 is used as a program coordinate system, which serves for programming thereon. The program coordinate system serves as a workpiece coordinate system when a tool end point control mode is programmed. The origin of the workpiece coordinate system is given by (w0x, w0y, w0z), and the position of the center of rotation of the C-axis is given by (rcx, rcy, rcz). The program coordinate system rotates as the table rotates.

In the fourth embodiment, as in the third embodiment, if a circular arc PA-PB is programmed as a two-dimensional circular arc on the X-Y, Y-Z or Z-X plane in the program coordinate system, the tool postures (ai, bi) are obtained according to the equations (1) and (2), and the tool posture vector Vti (ii, ji, ki) is obtained according to the equations (3), (4) and (5). If the circular arc PA-PB is not a two-dimensional circular arc, on the other hand, the midpoint PM is programmed, the tool postures (ai, bi) are obtained according to the equations (10) to (13), and the tool posture vector Vti (ii, ji, ki) is then obtained according to the equations (3), (4) and (5), as in the third embodiment (or in the first and second embodiments).

Based on the tool posture vector Vti (ii, ji, ki) obtained in this manner, the B-axis position Bai, C-axis position Cai, X-axis position Xai, Y-axis position Yai, and Z-axis position Zai for movement are obtained according to the following equations (16) and (17).

The following equation (16) holds, since a vector obtained by rotating the tool posture (0, 0, −1) with the B-axis position at 0 degree by the B-axis position Bai is identical to a vector obtained by rotating the tool posture vector Vti (ii, ji, ki) by the C-axis position Cai. The C- and B-axis positions Cai and Bai for distances of movement can be obtained by solving the equation (16).

$$\begin{pmatrix} \cos(Bai) & 0 & \sin(Bai) \\ 0 & 1 & 0 \\ -\sin(Bai) & 0 & \cos(Bai) \end{pmatrix} \begin{pmatrix} 0 \\ 0 \\ -1 \end{pmatrix} = \begin{pmatrix} \cos(-Cai) & -\sin(-Cai) & 0 \\ \sin(-Cai) & \cos(-Cai) & 0 \\ 0 & 0 & 1 \end{pmatrix} \begin{pmatrix} ii \\ ji \\ ki \end{pmatrix} \quad (16)$$

If the circular interpolation point on the program coordinate system is (cxi, cyi, czi), moreover, the X-, Y-, and Z-axis positions Xai, Yai and Zai for movement can be obtained by executing the calculation of the following equation (17). The positions Xai, Yai and Zai correspond to the XYZ-axis control point (position of the center of rotation of the B-axis) 3 shown in FIG. 7.

$$\begin{pmatrix} Xai \\ Yai \\ Zai \\ 1 \end{pmatrix} = \begin{pmatrix} \cos(-Cai) & -\sin(-Cai) & 0 & rcx \\ \sin(-Cai) & \cos(-Cai) & 0 & rcy \\ 0 & 0 & 1 & rcz \\ 0 & 0 & 0 & 1 \end{pmatrix} \begin{pmatrix} w0x + cxi - rcx \\ w0y + cyi - rcy \\ w0z + czi - rcz \\ 1 \end{pmatrix} + \begin{pmatrix} \cos(Bai) & 0 & \sin(Bai) & 0 \\ 0 & 1 & 0 & 0 \\ -\sin(Bai) & 0 & \cos(Bai) & 0 \\ 0 & 0 & 0 & 1 \end{pmatrix} \begin{pmatrix} 0 \\ 0 \\ tl \\ 0 \end{pmatrix} \quad (17)$$

Figure 8:
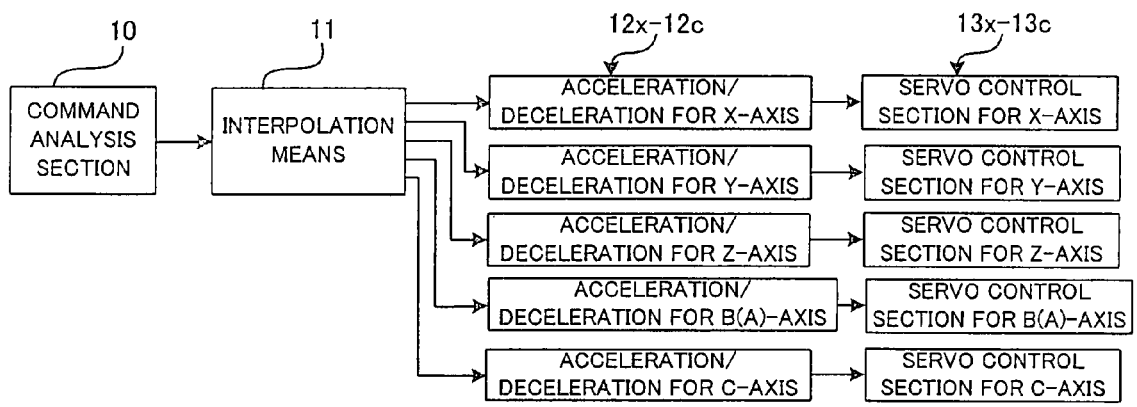
FIG. 8 is a functional block diagram showing principal parts of a numerical controller for carrying out each of the embodiments of the invention.

FIG. 8 is a functional block diagram showing principal parts of the numerical controller for carrying out each of the embodiments described above. Since the configuration of the numerical controller is similar to that of a numerical controller for controlling a conventional five-axis machine, it is shown briefly in the functional block diagram.

A command analysis section 10 analyzes the program commands and creates execution command data. Interpolation means 11 obtains motion commands for the individual axes for each interpolation period based on the execution data, performs acceleration/deceleration processes 12x to 12c for the X-, Y-, Z-, B- (or A-), and C-axes, and outputs the motion commands to servo control sections 13x to 13c for the X-, Y-, Z-, B- (or A-), and C-axes, individually. The servo control sections 13x to 13c perform position, vector, and current feedback controls and drive servomotors for the individually axes.

Figure 9:
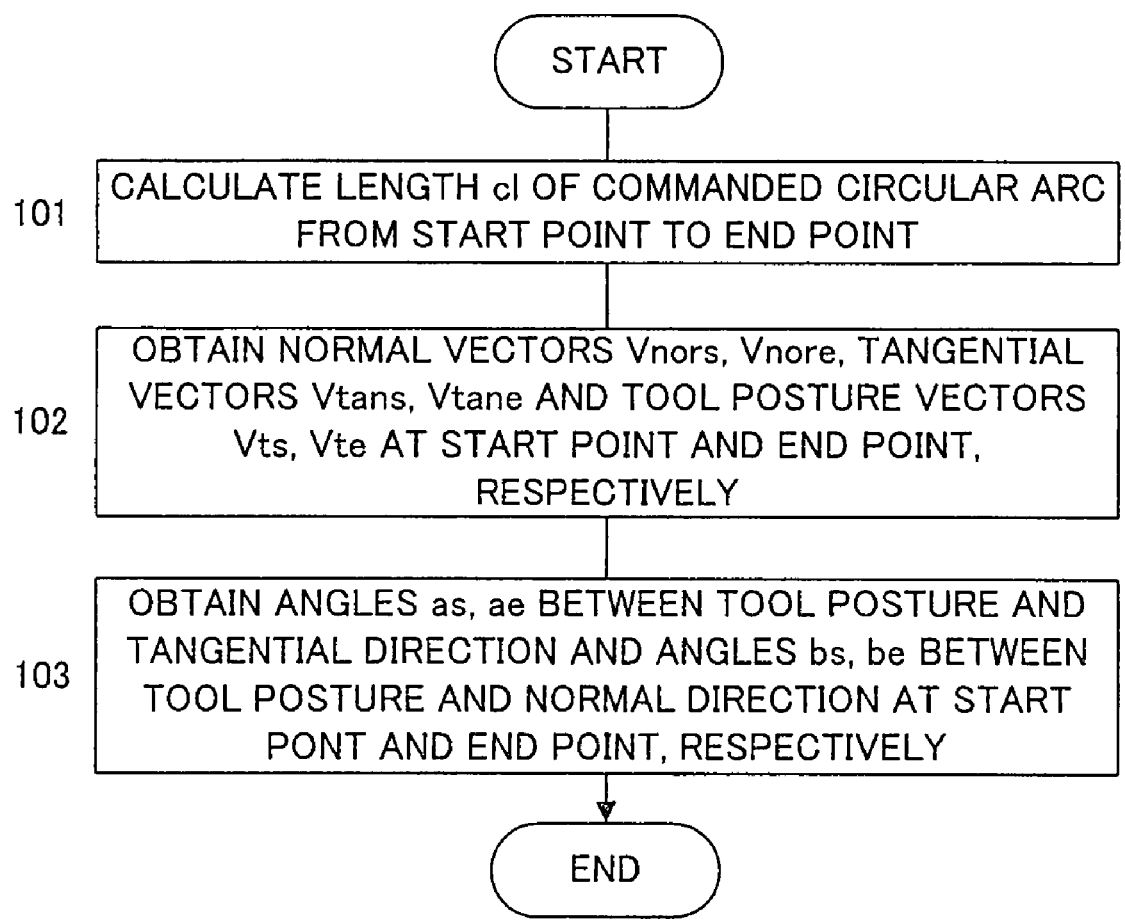
FIG. 9 is a flowchart showing an algorithm of machining processes for a conical surface in an analysis section according to the first embodiment of the invention.
Figure 10:
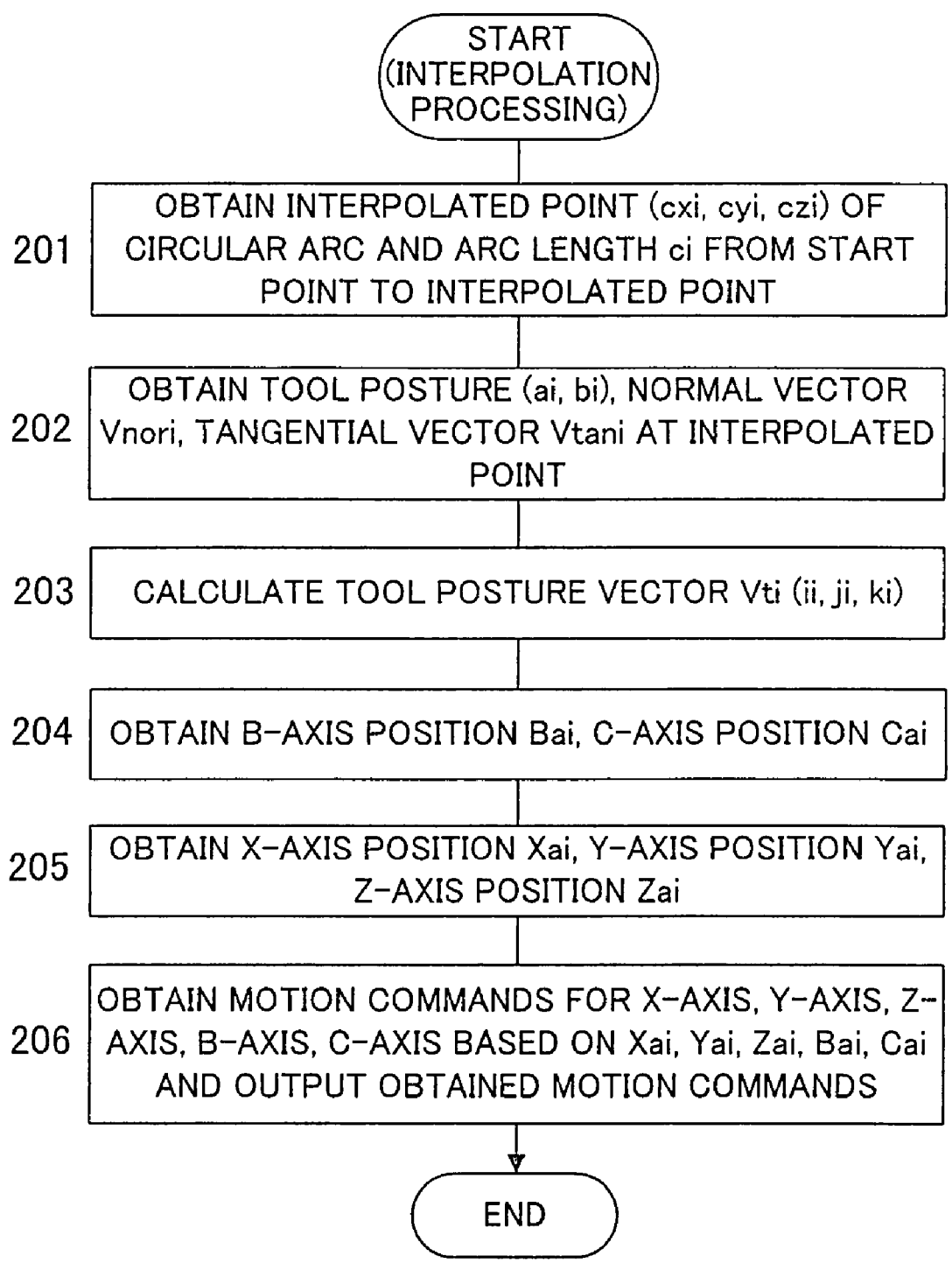
FIG. 10 is a flowchart showing an algorithm of interpolation processing in the machining processes for the conical surface according to the first embodiment of the invention.
Figure 11A:
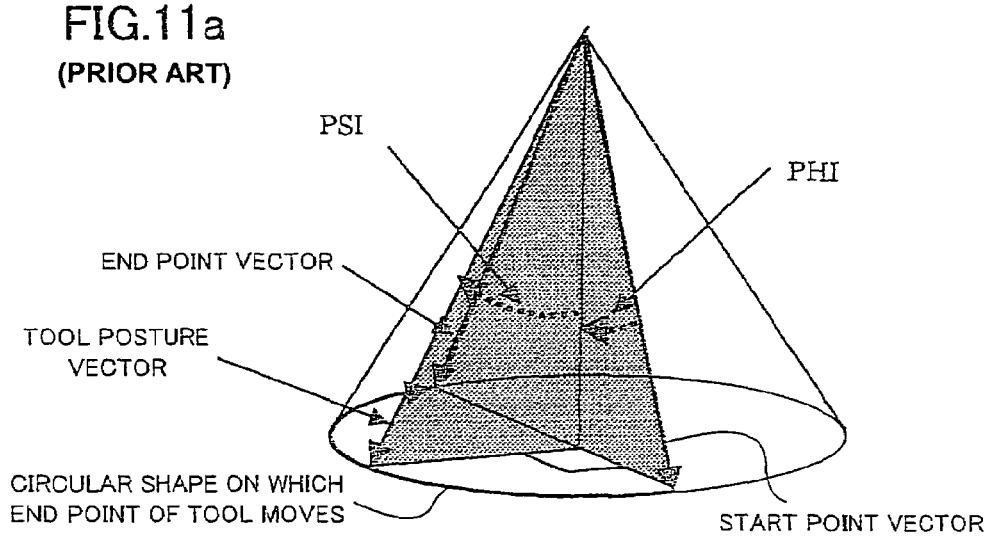
FIGS. 11a and 11b are views illustrating prior art machining of a first conical surface.
Figure 11B:
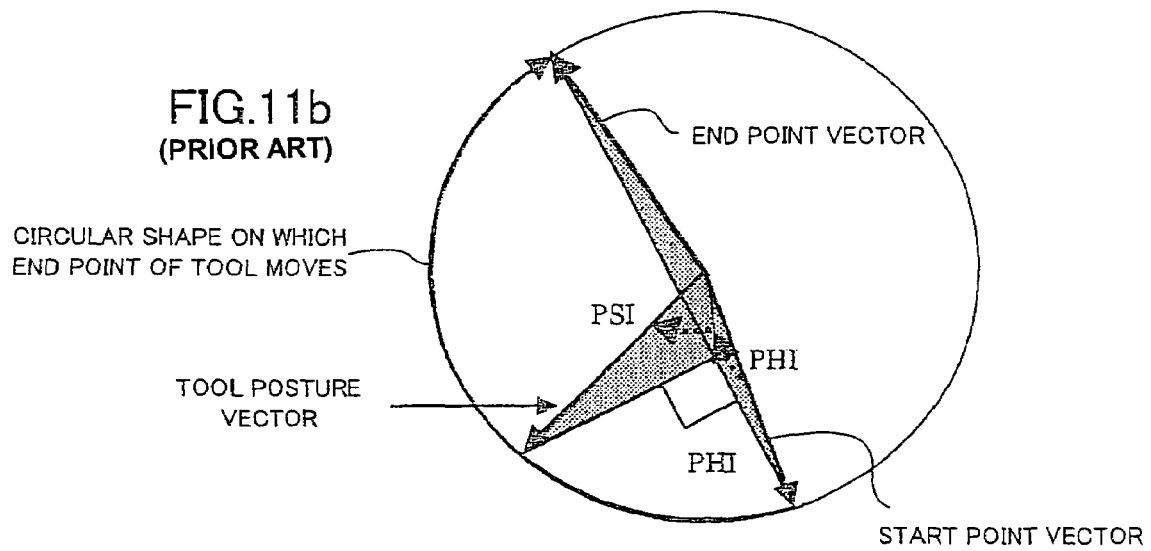
Figure 12:
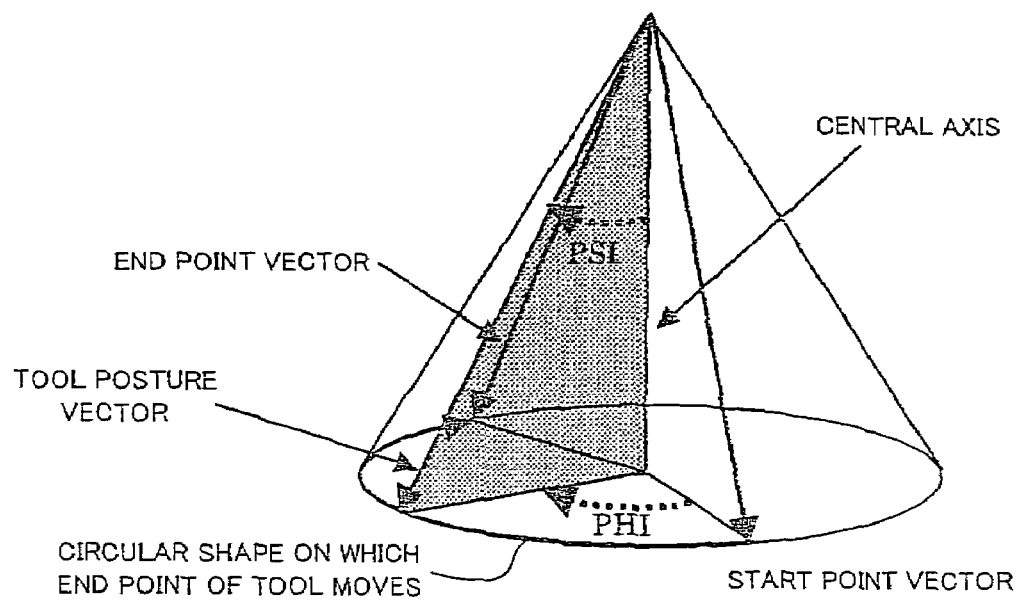
FIG. 12 is a view illustrating prior art machining of a second conical surface.
Figure 13:
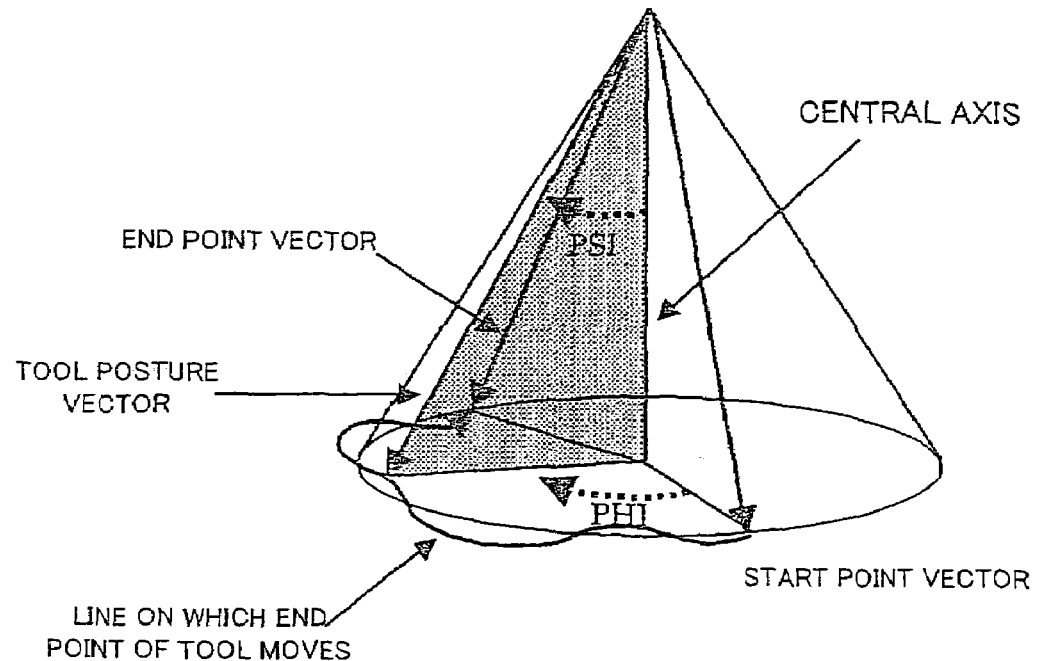
FIG. 13 is a view illustrating prior art machining of a third conical surface.
Figure 14A:
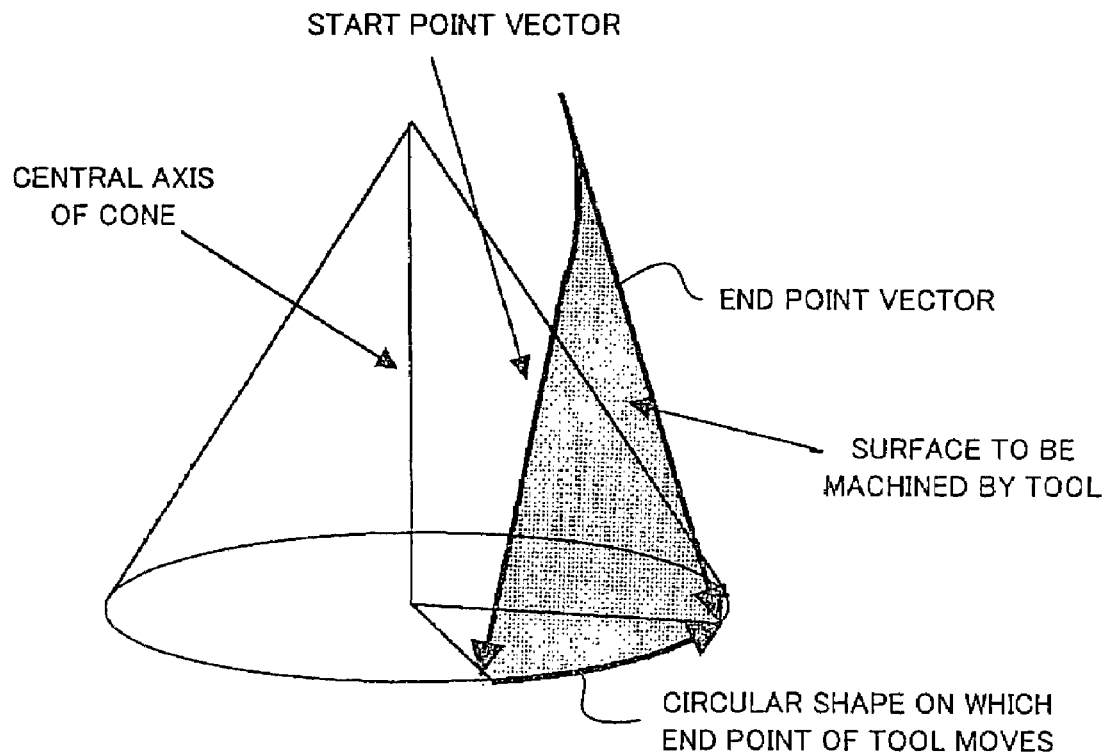
FIGS. 14a and 14b are views illustrating a conical surface machinable by no prior art technique.
Figure 14B:
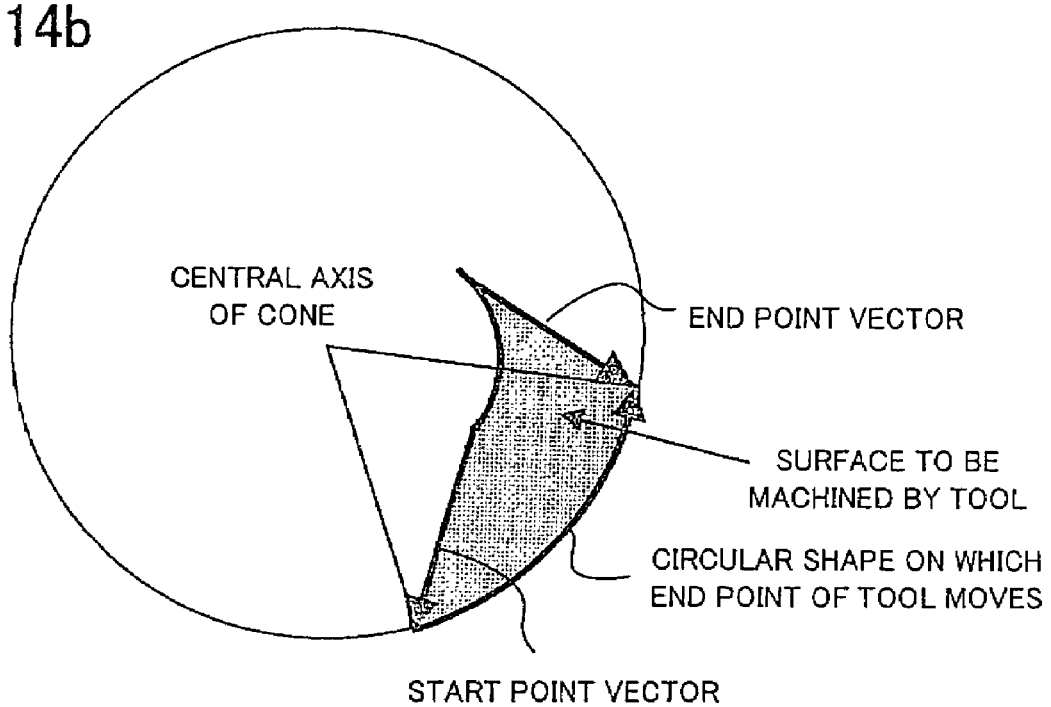

FIGS. 9 and 10 are flowcharts showing an algorithm of machining processes for the conical surface according to the first embodiment that are carried out by a processor of the numerical controller. FIG. 9 is a flowchart showing those processes in the command analysis section 10 which are associated with the present invention. FIG. 10 is a flowchart showing those processes carried out by the interpolation means 11 with every interpolation period which are associated with the invention.

If the circular command "G03" is read from the program, the processor starts the processes of FIG. 9 as those ones in the command analysis section 10 which are associated with the present invention, and first obtains the arc length cl between the starting and end points (Step 101).

Then, the normal direction vectors Vnors and Vnore, tangential direction vectors Vtans and Vtane, and tool posture vectors Vts and Vte at the starting and end points are obtained from the positions of the starting and end points and the arc center specified by the program (Step 102).

The angles as and ae to the traveling direction and the angles bs and be to the normal direction at the starting and end points are obtained by calculating the inner product of the tool and tangential direction vectors and the inner product of the tool and normal direction vectors, as mentioned before, whereupon the processes in the command analysis section 10 are finished (Step 103).

In the processes for the interpolation means 11, on the other hand, the processor performs circular interpolation between the starting and end points of the programmed circular arc in the same manner as in the conventional case, and obtains the circular interpolation point (cxi, cyi, czi) and the arc length ci from the start point to the interpolation point (Step 201).

The angles ai and bi of the tool posture to the tangential direction and the normal direction are obtained by executing the calculations of the equations (1) and (2), based on the arc length cl obtained in Step 101, the angles as and ae to the tangential direction and the angles bs and be to the normal direction at the starting and end points obtained in Step 103, and the arc length ci from the start point to the interpolation point obtained in Step 201. Further, the normal direction vector Vnori and the tangential direction vector Vtani at the interpolation point are obtained by the conventional circular interpolation, a prior art technique (Step 202).

The tool posture vector Vti (ii, ji, ki) is obtained by executing the calculations of the equations (3) to (5) based on the angles ai and bi, normal direction vector Vnori, and tangential direction vector Vtani at the interpolation point (Step 203).

The rotary B-axis position Bai and the C-axis position Cai are obtained by executing the calculation of equation (6) based on the tool posture vector Vti (ii, ji, ki) (Step 204).

The X-axis position Xai, Y-axis position Yai, and Z-axis position Zai are obtained by executing the calculations of the equations (7) to (9) based on the circular interpolation point (cxi, cyi, czi) obtained in Step 201, the tool posture vector Vti (ii, ji, ki) obtained in Step 203, and the tool length tl (Step 205).

Differences between the obtained X-axis position Xai, Y-axis position Yai, Z-axis position Zai, B-axis position Bai, and C-axis position Cai and the positions obtained by the preceding interpolation period are outputted as motion command values for the individual axes to acceleration/deceleration processing section (Step 206), whereupon this interpolation processing terminates. Thereafter, this processing is executed to control the drive of the five-axis machine, thereby machining a conical surface, with every interpolation period.

FIGS. 9 and 10 show processing according to the first embodiment in which the programmed circular arc is two-dimensional. If the circular arc is three-dimensional, as in the case of the second embodiment, however, the midpoint is programmed, and the programmed arc length clm from the start point to the midpoint and the arm length clb from the midpoint to the end point are also obtained in Step 101. The normal direction vector Vnorm and the tangential direction vector Vtanm at the midpoint are obtained in Step 102, while the angles am and bm of the tool posture to the tangential direction and the normal direction at the midpoint are obtained in Step 103. In Step 204, the tool postures ai and bi at the interpolation point are obtained according to the equations (10) to (13). Other processes resemble the processes shown in FIG. 10.

The processing according to the third embodiment is different in that the A- and C-axis positions Aai and Cai are obtained by executing the calculation of the equation (14) in Step 204, that the X-, Y-, and Z-axis positions Xai, Yai and Zai are obtained by executing the calculation of the equation (15) in Step 205, and that motion commands for the X-, Y-, Z-, A-, and C-axes are obtained and outputted based on the A-axis position Aai in place of the B-axis position Bai in Step 206. Other particulars are the same.

Further, the fourth embodiment is difference in that B- and C-axis positions Bai and Cai are obtained by executing the calculation of the equation (16) in Step 204 and that the X-, Y-, and Z-axis positions Xai, Yai and Zai are obtained by executing the calculation of the equation (17) in Step 205, and other particulars are the same.

According to each of the embodiments, as described above, machining can be performed for any of conical surfaces, in which the start point vector (tool posture vector at the start point), end point vector (tool posture vector at the end point), and tool posture vector on a conical surface being interpolated, or their extensions never cross one another, and other machined surfaces in which the vectors cross one another. The programmed circular arc is not limited to a two-dimensional one, and machining can be also performed for a three-dimensional programmed circular arc.

What is claimed is:

1. A numerical controller controlling a machining apparatus having a tool machining a workpiece and servomotors driving a plurality of axes including at least two rotary axes, wherein interpolation processing is performed on a motion path of the tool commanded by a machining program and motion commands are outputted respectively for the plurality of axes based on the interpolation processing, said numerical controller comprising:

analyzing means for analyzing commands of the machining program and obtaining data of a length of a circular arc, angles between postures of the tool and tangential directions of the circular arc at a start point and an end point of the circular arc, respectively, and angles between postures of the tool and normal directions of the circular arc on a plane on which the circular arc is placed at the start point and the end point of the circular arc, respectively;

interpolating means for obtaining data of an interpolated position of the circular arc and a posture of the tool at the interpolated position of the circular arc at every sampling period based on the data obtained by said analyzing means;

position calculating means for obtaining target positions of the plurality of axes based on the data obtained by said interpolating means; and moving means for moving the plurality of axes to the target positions obtained by said position calculating means.

2. A numerical controller according to claim 1, wherein said interpolating means obtains an arc length from the start point to the interpolated position of the circular arc, and an angle between the posture of the tool and the tangential direction of the circular arc and an angle between the posture of the tool and the normal direction of the circular arc at the interpolated position of the circular arc by interpolating the angles of the posture of the tool at the start point and the end point of the circular arc obtained by said analysis means using the length of the circular arc and the arc length from the start point to the interpolated position of the circular arc.

3. A numerical controller according to claim 2, wherein said position calculating means obtains a tool posture vector indicative of the posture of the tool at the interpolated position of the circular arc based on the data obtained by said interpolating means, obtains the rotational positions of the rotary axes and positions of the axes other than the rotational axes at the interpolated point of the circular arc using the tool posture vector.

4. A numerical controller according to claim 1, wherein the commands of the machining program include designation of positions of a center, the start point and the end point of the circular arc, and designation of rotational positions of the rotary axes at the start point and the end point of the circular arc.

5. A numerical controller according to claim 1, wherein the commands of the machining program include designation of the positions of the start point and the end point of the circular arc and a position of an midpoint of the circular arc, and designation of rotational positions of the rotary axes at the start point, the end point and the midpoint of the circular arc.

6. A numerical controller according to claim 1, wherein the machining apparatus has a tool head arranged rotatable by the two rotary axes.

7. A numerical controller according to claim 1, wherein the machining apparatus has a table arranged rotatable by the two rotary axes.

8. A numerical controller according to claim 1, wherein the machining apparatus has a tool head and a table arranged rotatable by the two rotary axes.

* * * * *

UNITED STATES PATENT AND TRADEMARK OFFICE
CERTIFICATE OF CORRECTION

PATENT NO. : 7,433,754 B2 Page 1 of 1
APPLICATION NO. : 11/790069
DATED : October 7, 2008
INVENTOR(S) : Toshiaki Otsuki et al.

It is certified that error appears in the above-identified patent and that said Letters Patent is hereby corrected as shown below:

Column 2, Line 53, change "an" to --a--.

Column 4, Line 61, change "(nor *ii*," to --(nor*ii*,--.

Column 8, Line 67, change "respectively," to --respectively.--.

Column 14, Line 38, change "an" to --a--.

Signed and Sealed this

Thirtieth Day of December, 2008

JON W. DUDAS
*Director of the United States Patent and Trademark Office*